(12) United States Patent
Kawahara et al.

(10) Patent No.: US 9,011,257 B2
(45) Date of Patent: Apr. 21, 2015

(54) LOCK-UP DEVICE FOR FLUID COUPLING

(75) Inventors: Yuki Kawahara, Osaka (JP); Kazuhiro Yamashita, Hirakata (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 13/883,960

(22) PCT Filed: Oct. 11, 2011

(86) PCT No.: PCT/JP2011/073293
§ 371 (c)(1),
(2), (4) Date: May 7, 2013

(87) PCT Pub. No.: WO2012/063586
PCT Pub. Date: May 18, 2012

(65) Prior Publication Data
US 2013/0225302 A1   Aug. 29, 2013

(30) Foreign Application Priority Data

Nov. 11, 2010 (JP) .................................. 2010-252579
Dec. 10, 2010 (JP) .................................. 2010-275613

(51) Int. Cl.
| | | |
|---|---|---|
| *F16F 15/121* | (2006.01) | |
| *F16D 3/66* | (2006.01) | |
| *F16F 15/123* | (2006.01) | |
| *F16H 45/02* | (2006.01) | |

(52) U.S. Cl.
CPC ............ *F16D 3/66* (2013.01); *F16F 15/12366* (2013.01); *F16H 45/02* (2013.01); *F16H 2045/0205* (2013.01); *F16H 2045/0231* (2013.01); *F16H 2045/0294* (2013.01)

(58) Field of Classification Search
CPC . F16F 15/121; F16F 12/123; F16F 15/12313; F16F 15/12373
USPC ..................... 464/66.1, 68.8–68.92; 192/203, 192/213.2–213.22, 213
See application file for complete search history.

(56) References Cited

U.S. PATENT DOCUMENTS

| | | | |
|---|---|---|---|
| 4,493,674 A | * | 1/1985 | Tamura et al. |
| 5,380,248 A | * | 1/1995 | Kraus et al. .................. 464/66.1 |
| 2002/0128074 A1 | | 9/2002 | Jackel et al. |
| 2004/0185940 A1 | | 9/2004 | Yamamoto et al. |

FOREIGN PATENT DOCUMENTS

| | | |
|---|---|---|
| JP | 2001-082577 A | 3/2001 |
| JP | 2002-089658 A | 3/2002 |
| JP | 2002-130377 A | 5/2002 |
| JP | 2002-310238 A | 10/2002 |
| JP | 2004-278744 A | 10/2004 |
| JP | 3717772 B2 | 11/2005 |
| JP | 2009-243532 A | 10/2009 |

* cited by examiner

*Primary Examiner* — Gregory Binda
(74) *Attorney, Agent, or Firm* — Global IP Counselors, LLP

(57) ABSTRACT

A lock-up device for a fluid coupling suppresses vibration caused by coil springs. The lock-up device includes an input rotation member, an output rotation member, a plurality of first elastic members, and a float member. The plurality of first elastic members are compressed in a rotational direction by the relative rotation of the input rotation member and the output rotation member. The float member is rotatable relative to the input rotation member to cause two of the first elastic members to act in series in a circumferential direction.

6 Claims, 8 Drawing Sheets

LOCK-UP DEVICE FOR FLUID COUPLING

CROSS-REFERENCE TO THE RELATED APPLICATIONS

This U.S. national phase application claims priority to Japanese Patent Application Nos. 2010-252579 and 2010/275613 filed on Nov. 11, 2010 and Dec. 10, 2010 respectively. The entire disclosure of Japanese Patent Application Nos. 2010-252579 and 2010/275613 is hereby incorporated herein by reference

BACKGROUND

1. Technical Field

The present invention relates to a lock-up device and particularly to a lock-up device for a fluid coupling for transmitting torque and absorbing and damping torsional vibration.

2. Background Art

There are many cases where a lock-up device for directly transmitting torque from a front cover to a turbine is disposed in torque converters. The lock-up device is equipped with a piston, a drive plate, plural outer peripheral side torsion springs, a driven plate, plural inner peripheral side torsion springs, and a middle member (Japanese Patent Application No. 2001-82577). The piston is coupleable to the front cover. The drive plate is coupled to the piston. The torque is input from the drive plate to the plural outer peripheral side torsion springs. The driven plate is coupled to the turbine. The plural inner peripheral side torsion springs are arranged on the inner peripheral side of the outer peripheral side torsion springs and transmit the torque to the driven plate. The middle member is rotatable relative to the drive plate and the driven plate and transmits the torque from the outer peripheral side torsion springs to the inner peripheral side torsion springs.

SUMMARY

Technical Problem

In lock-up devices, widening the torsion angle of the damper is effective in order to efficiently absorb and damp torque fluctuations input from the engine. Therefore, in the lock-up device described in Japanese Patent Application No. 2001-82577, the torsion angle of the damper is designed wide by arranging the torsion springs on the outer peripheral portion and the inner peripheral portion and using the middle member to couple together the outer peripheral side torsion springs and the inner peripheral side torsion springs in series.

In recent years, there has been a demand to lower fuel consumption by further improving characteristics. For example, consider a case where the technology of U.S. Pat. No. 3,717,772 is used in addition to the well-known technology described above. In this case, not only can the outer peripheral side torsion springs and the inner peripheral side torsion springs be coupled together in series by the middle member, but two of the outer peripheral side torsion springs can also be coupled together in series via a float member. Because of this, the torsion angle of the damper can be designed wider and the demand described above can be satisfied.

However, in a case where the torsion angle of the damper has been widened in this way, there is the concern that a normal mode resulting from adding the float member will occur. For example, in a case where the float member has been added, the potential for the normal mode to become manifest in the high speed range becomes higher, and when the normal mode appears in the normal speed range of the engine, there is the concern that unpleasant vibrations and vibration sounds will end up occurring.

The present invention has been made in view of this problem, and it is an advantage of the present invention to keep the vibration level of a lock-up device in an allowable range.

Solution to Problem

A lock-up device for a fluid coupling transmits torque and absorbs and damps torsional vibration. The lock-up device for a fluid coupling includes an input rotation member, an output rotation member, plural first elastic members, and a float member. The plural first elastic members are compressed in a rotational direction by the relative rotation of the input rotation member and the output rotation member. The plural first elastic members are arranged adjacently in the circumferential direction in a predetermined position in a radial direction. The float member is placed in such a way as to be rotatable relative to the input rotation member in order to cause at least two of the first elastic members among the plural first elastic members to act in series in a circumferential direction. In this lock-up device, in the at least two first elastic members that act in series in the circumferential direction because of the float member, the free length of either one of the first elastic members is made shorter than the free length of the other of the first elastic members, whereby the rigidity of the either one of the first elastic members is set greater than the rigidity of the other of the first elastic members.

In this lock-up device, when the torque from the engine is input to the input rotation member, the torque is transmitted to the output rotation member via the plural first elastic members. Further, the at least two first elastic members among the plural first elastic members are coupled together in series in the circumferential direction by the float member. Here, the free length of either one of the at least two first elastic members coupled together in series in the circumferential direction is shorter than the free length of the other of the first elastic members, so the rigidity of the first elastic member with the short free length becomes greater than the rigidity of the other first elastic member.

Here, an outline of the vibration level of the lock-up device will be described as basic information for describing the effects of the present lock-up device. For example, considering the vibration curve (speed-vibration level curve; reference curve; see the dashed line in FIG. 5) of the lock-up device in a case where the float member is not present, in this reference curve, the normal mode (primary mode) of the lock-up device appears below the lock-up speed Na for example. Additionally, in this reference curve, the higher the speed becomes the more the vibration level falls. On the other hand, the vibration curve of the lock-up device in a case where the float member is present becomes one where the vibration component of the float member is superimposed on this reference curve (see the solid line in FIG. 5). For this reason, in the vibration curve in a case where the float member is present, as the speed at which vibration of the float member occurs becomes higher, the speed at which the vibration component of the float member becomes prominent—that is, the speed at which the float member resonates—also becomes higher. Considering this fact in combination with the fact that, in the reference curve described above, the higher the speed becomes the more the vibration level falls, when the speed at which the float member resonates becomes high, the resonance level of the float member (component of reference curve+resonance component of float member) falls.

In a case where the resonance speed of the float member in the present lock-up device has been found on the basis of this consideration, the resonance speed of the float member is affected by the at least two first elastic members arranged in series in the circumferential direction because of the float member. For example, in a case where the first elastic members arranged in series in the circumferential direction because of the float member have been set to different lengths (a case where the first elastic members have been set to different rigidities), the resonance speed of the float member becomes higher compared to a case where the first elastic members have been set to the same lengths (a case where the first elastic members have been set to the same rigidities). In this way, in the present lock-up device, by setting the first elastic members arranged in series in the circumferential direction because of the float member to different lengths, the resonance speed of the float member can be set to a higher speed than the resonance speed of the well-known float member. Because of this, in the present lock-up device, the resonance level of the float member can be lowered and the vibration level of the lock-up device can be kept in the allowable range.

A lock-up device for a fluid coupling further includes plural second elastic members and a middle member. The plural second elastic members are arranged on either one of an inner peripheral side and an outer peripheral side of the plural first elastic members and transmit the torque to the output rotation member. The middle member is placed in such a way as to be rotatable relative to the input rotation member in order to transmit the torque from the first elastic members to the second elastic members.

Here, the lock-up device further includes the plural second elastic members and the middle member, and the torque from the engine is transmitted from the first elastic members to the second elastic members via the middle member. In this way, even if the torsion angle of the damper has been widened, in the present lock-up device, by setting the first elastic members arranged in series in the circumferential direction because of the float member to different lengths, the resonance speed of the float member can be set to a higher speed than the resonance speed of the float member. Because of this, in the present lock-up device the resonance level of the float member can be lowered, and the vibration level of the lock-up device can be kept in the allowable range.

A lock-up device for a fluid coupling can include at least two first elastic members that act in series in the circumferential direction because of the float member, the first elastic member with the short free length is placed on the side to which the torque is input by the input rotation member.

Here, the first elastic member with the short free length is placed on the input side. In a case where the resonance speed of the float member has been calculated as described above, the resonance speed of the float member can be made higher by making the rigidity of the first elastic member with the short free length (the first elastic member on the input side) higher than the rigidity of the other elastic member. Because of this, in the present lock-up device, the resonance level of the float member can be efficiently lowered, and the vibration level of the lock-up device can be kept in the allowable range.

A lock-up device for a fluid coupling can include at least two first elastic members that act in series in the circumferential direction because of the float member, the first elastic member with the long free length is placed on the side to which the torque is input by the input rotation member.

Here, the first elastic member with the long free length is placed on the input side. In a case where the resonance speed of the float member has been calculated as described above, the resonance speed of the float member can be made higher by making the first elastic member with the short free length (the rigidity of the first elastic member on the input side) higher than the rigidity of the other elastic member. In other words, the resonance speed of the float member can be made lower by making the first elastic member with the long free length (the rigidity of the first elastic member on the input side) lower than the rigidity of the other first elastic member.

Here, generally there is tendency for the resonance speed of the float member to approach the lock-up speed in the normal speed range the greater the number of cylinders in the engine there are. In this case, there is the concern that the lock-up device will end up being strongly affected by the resonance of the float member at the lock-up speed. In such a case as this, by placing the first elastic member with the long free length on the input side, the resonance speed of the float member can be set to a lower speed range than the lock-up speed. Because of this, the effect of the resonance of the float member in the normal speed range can be removed. That is, in the present lock-up device, the vibration level of the lock-up device can be kept in the allowable range.

The free lengths of the at least two first elastic members are set in such a way that the sum total of the free lengths of the at least two elastic members that act in series in the circumferential direction because of the float member becomes fixed. For example, in the at least two first elastic members that act in series in the circumferential direction because of the float member, the free lengths of the first elastic members are set in such a way that the sum total of the free length of either one of the first elastic members and the free length of the other elastic member becomes a predetermined length. In this case, even if the free length of either one of the first elastic members has been made shorter, the free length of the other first elastic member becomes longer in accordance therewith, so it is ensured that the total rigidity of the at least two first elastic members that act in series in the circumferential direction because of the float member is constant. That is, the resonance speed of the float member can be set to a higher speed than the resonance speed of the well-known float member while maintaining the normal mode (primary mode) of the lock-up device below the lock-up speed, for example. Because of this, resonance problems with the lock-up device can be reliably prevented in the normal range.

The lock-up device for a fluid coupling includes an input rotation member, an output rotation member, plural sets of first elastic members, and a float member. The plural sets of first elastic members are compressed in a rotational direction by the relative rotation of the input rotation member and the output rotation member. The plural sets of the first elastic members are arranged adjacently in a circumferential direction in a predetermined position in a radial direction. Further, the plural sets of the first elastic members are rotatable relative to the float member. One set of the first elastic members is configured by plural spring members. The plural spring members are arranged in series continuously in the circumferential direction. The float member restricts the movement of the spring members (first elastic members) in the radial direction.

In this lock-up device, when the torque from the engine is input to the input rotation member, the torque is transmitted to the output rotation member via the plural sets of the first elastic members. Here, the plural sets of the first elastic members are arranged adjacently in the circumferential direction in a predetermined position in the radial direction. Here, the plural sets of the first elastic members are rotatable relative to the float member, and the movement of the plural sets of the first elastic members in the radial direction is restricted by the float member. In this state, when the torque is input to each set of the first elastic members, the plural spring members configuring each set of the first elastic members act in series in the circumferential direction.

Here, an outline regarding the vibration level of the well-known lock-up device will be described as basic information for describing the effects of the present lock-up device. Considering the vibration curve (speed-vibration level curve; reference curve; see the solid line in FIG. 5) of the lock-up device in a case where the float member is present, in this reference curve, the normal mode (primary mode) of the lock-up device appears below the lock-up speed Na for example. Additionally, the normal mode of the float member appears in the range of a speed greater than the lock-up speed Na. Hereinafter, the speed Nf at which the normal mode of the float member appears will be called the speed at which the vibration component of the float member becomes prominent—that is, the resonance speed of the float member.

In this well-known lock-up device, the normal mode of the float member appears because the float member is incorporated in the vibration system. Specifically, in the well-known lock-up device, the normal mode of the float member appears because the float member is caused to engage with two spring members whereby the two spring members are caused to act in series in the circumferential direction. With respect thereto, in the present lock-up device, the float member restricts the movement of the first elastic members in the radial direction but is not caused to engage with the first elastic members. Specifically, the plural spring members are arranged in series continuously in the circumferential direction without involving the float member. Further, the plural spring members are rotatable relative to the float member. Because of this, in the present lock-up device, the vibration component of the float member can be removed from the vibration system. That is, in the present lock-up device, the resonance resulting from the float member can be removed from the vibration system. Because of this, in the present lock-up device, the vibration level can be kept in the allowable range.

Both end portions of each of the plural spring members and the float member can be rotatable relative to each other.

Here, both end portions of each of the plural spring members and the float member are rotatable relative to each other, so the plural spring members act in series continuously in the circumferential direction without involving the float member. For this reason, in the present lock-up device, the vibration component of the float member—that is, the resonance resulting from the float member—can be removed from the vibration system. Because of this, in the present lock-up device, the vibration level can be kept in the allowable range.

The torque can be transmitted in the order of the input rotation member, the plural sets of the first elastic members, and the output rotation member.

Here, the torque is transmitted in the order of the input rotation member, the plural sets of the first elastic members, and the output rotation member. That is, the torque is transmitted via the plural sets of the first elastic members from the input rotation member to the output rotation member without involving the float member. For this reason, in the present lock-up device, the vibration component of the float member—that is, the resonance resulting from the float member—can be removed from the vibration system. Because of this, in the present lock-up device, the vibration level can be kept in the allowable range.

The plural spring members can be arranged in series continuously in the circumferential direction via seat members.

Here, the plural spring members are arranged in series continuously in the circumferential direction via the seat members, so the plural spring members can be caused to act in series continuously in the circumferential direction. Because of this, torque fluctuations can be reliably transmitted to the plural spring members. Further, torque fluctuations can be efficiently absorbed and damped in the spring members.

The plural spring members can be arranged in series directly and continuously in the circumferential direction.

Here, the plural spring members are arranged in series directly and continuously in the circumferential direction. For example, the plural spring members are arranged in series continuously in the circumferential direction as a result of adjacent end portions of the plural spring members being brought into contact with each other. More specifically, the plural spring members are arranged in series continuously in the circumferential direction as a result of adjacent end turn portions of the plural spring members being brought into contact with each other. In this way, in the present lock-up device, special members such as spring seats become unnecessary, so the number of parts can be reduced and the plural spring members can be easily assembled.

The spring members can be configured from either one of linear coil springs and arc-shaped coil springs. Here, either one of linear coil springs and arc-shaped coil springs is used as the spring members, so torsion characteristics with various variations can be easily designed.

A lock-up device for a fluid coupling further includes plural second elastic members and a middle member. The plural second elastic members are arranged on either one of an inner peripheral side and an outer peripheral side of the plural sets of the first elastic members and transmit the torque to the output rotation member. The middle member is placed in such a way as to be rotatable relative to the input rotation member in order to transmit the torque from the first elastic members to the second elastic members.

Here, the lock-up device further includes the plural second elastic members and the middle member, and the torque from the engine is transmitted from the first elastic members to the second elastic members via the middle member. In this way, even if the torsion angle of the damper has been widened, in the present lock-up device, the vibration component of the float member—that is, the resonance resulting from the float member—can be removed from the vibration system, so the vibration level can be kept in the allowable range.

Advantageous Effects of Invention

According to the present invention as described above, the vibration level of a lock-up device can be kept in an allowable range.

DETAILED DESCRIPTION OF PREFERRED EMBODIMENTS

First Embodiment

Figure 1:
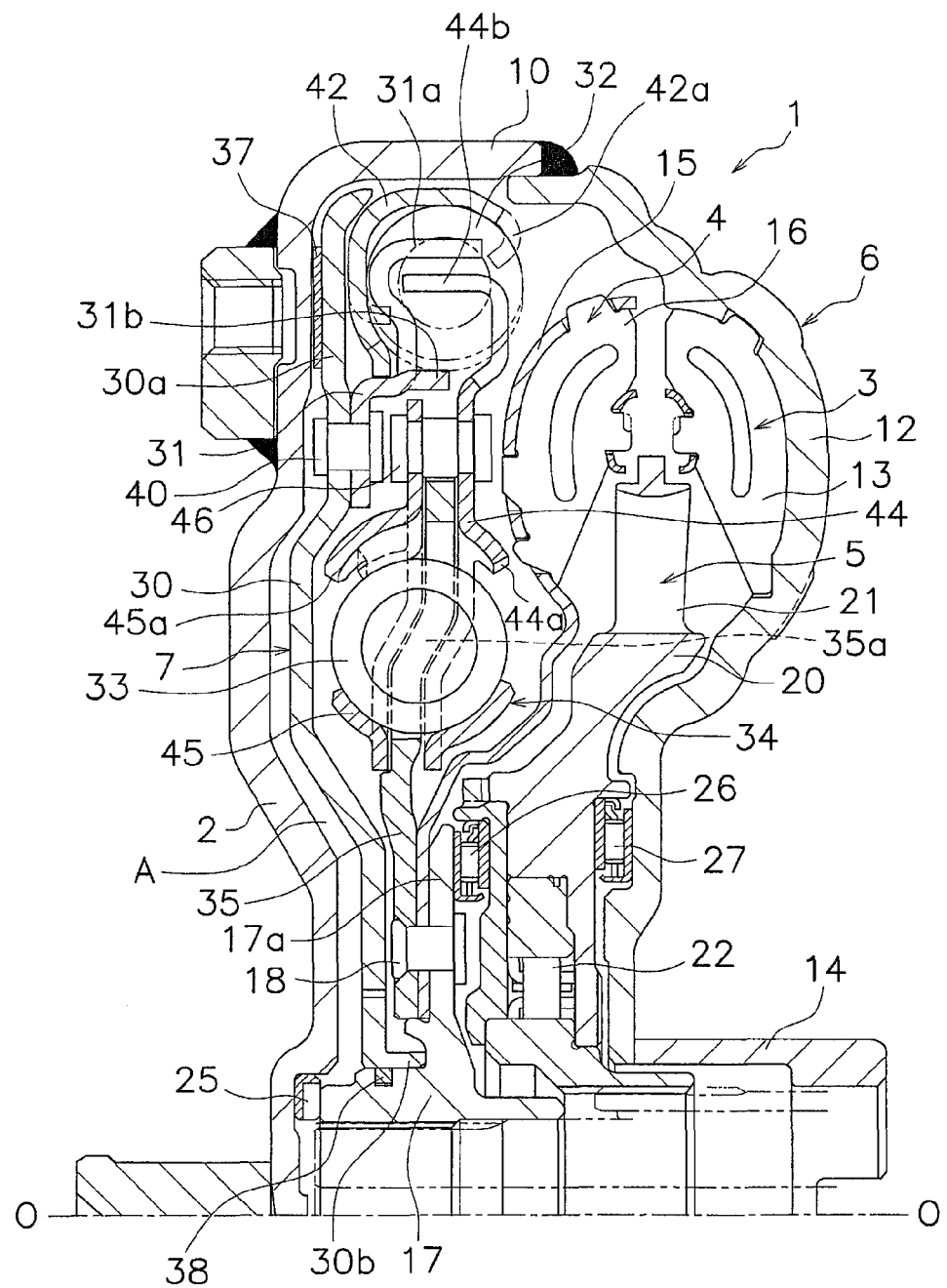
FIG. 1 is a cross-sectional partial view of a torque converter equipped with a lock-up device according to a first embodiment of the present invention.
Figure 2:
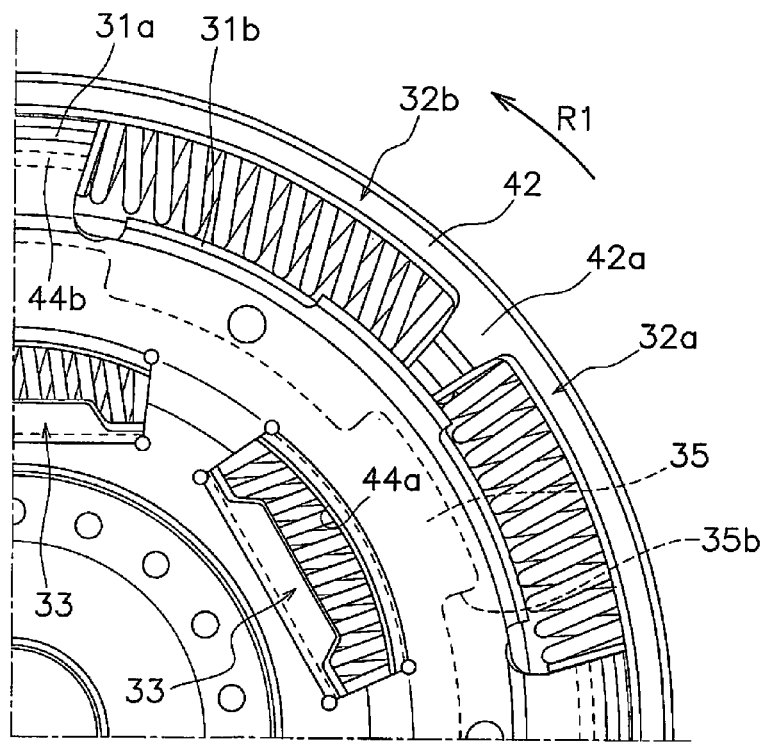
FIG. 2 is a front partial view of the lock-up device.

FIG. 1 is a cross-sectional partial view of a torque converter 1 in which a lock-up device serving as an embodiment of the present invention is employed. An engine (not shown in the drawings) is placed on the left side of FIG. 1, and a transmission (not shown in the drawings) is placed on the right side of the drawing. FIG. 2 is a front partial view of the lock-up device. O-O shown in FIG. 1 is an axis of rotation of the torque converter and the lock-up device.

Overall Configuration of Torque Converter

The torque converter 1 is a device for transmitting torque from a crankshaft (not shown in the drawings) on the engine side to an input shaft of the transmission and is configured from a front cover 2 that is fixed to a member on the input side, a torque converter body 6 that includes three types of vaned wheels (an impeller 3, a turbine 4, and a stator 5), and a lock-up device 7.

The front cover 2 is a disc-shaped member, and an outer peripheral cylindrical portion 10 that projects toward the axial direction transmission side is formed on the outer peripheral portion of the front cover 2. The impeller 3 is configured from an impeller shell 12 that is fixed by welding to the outer peripheral cylindrical portion 10 of the front cover 2, plural impeller blades 13 that are fixed to the inner side of the impeller shell 12, and a cylindrical impeller hub 14 that is disposed on the inner peripheral side of the impeller shell 12. The turbine 4 is placed in opposition to the impeller 3 inside a fluid chamber. The turbine 4 is configured from a turbine shell 15, plural turbine blades 16 that are fixed to the turbine shell 15, and a turbine hub 17 that is fixed to the inner peripheral side of the turbine shell 15. The turbine hub 17 has a flange 17a that extends toward the outer peripheral side, and the inner peripheral portion of the turbine shell 15 is fixed to the flange 17a by plural rivets 18. Further, the input shaft of the unillustrated transmission is spline-engaged with the inner peripheral portion of the turbine shell 17.

The stator 5 is placed between the inner peripheral portions of the impeller 3 and the turbine 4 and is a mechanism for redirecting hydraulic oil returning from the turbine 4 to the impeller 3. The stator 5 is mainly configured from a disc-shaped stator carrier 20 and plural stator blades 21 that are disposed on the outer peripheral surface of the stator carrier 20. The stator carrier 20 is supported on an unillustrated fixing shaft via a one-way clutch 22. A thrust washer 25 is disposed between the front cover 2 and the turbine hub 17 in the axial direction, and thrust bearings 26 and 27 are disposed between the turbine hub 17 and the stator carrier 20 and between the stator carrier 20 and the impeller shell 12, respectively.

Lock-Up Device

The lock-up device 7 is placed in an annular space between the front cover 2 and the turbine 4. The lock-up device 7 mainly has a piston 30, a drive plate 31, plural outer peripheral side and inner peripheral side torsion springs 32 and 33, a middle member 34 that couples together the outer peripheral side torsion springs 32 and the inner peripheral side torsion springs 33, and a driven plate 35.

Here, the piston 30 and the drive plate 31 correspond to an input rotation member, and the driven plate 35 corresponds to an output rotation member. Further, the outer peripheral side torsion springs 32 correspond to first elastic members, and the inner peripheral side torsion springs 33 correspond to second elastic members.

Piston

The piston 30 is a disc-shaped plate member and is placed in such a way as to divide the space between the front cover 2 and the turbine 4 in two in the axial direction. The outer peripheral portion of the piston 30 is a flat friction coupling portion 30a, and a friction facing 37 is disposed on the axial direction engine side of the friction coupling portion 30a. A flat friction surface is formed on the front cover 2 in opposition to the friction facing 37. Further, an inner peripheral cylindrical portion 30b that extends toward the axial direction transmission side is disposed on the inner peripheral edge of the piston 30. The inner peripheral surface of the inner peripheral cylindrical portion 30b is supported in such a way as to be movable in the axial direction and the rotational direction with respect to the outer peripheral surface of the turbine hub 17. In a state in which the distal end of the inner peripheral cylindrical portion 30b is in contact with part of the turbine hub 17, the movement of the piston 30 toward the axial direction transmission side is restricted. A seal ring 38 is disposed between the inner peripheral cylindrical portion 30b and the outer peripheral surface of the turbine hub 17.

In this way, a space A is formed between the front cover 2 and the piston 30. The outer peripheral portion of the space A is blocked in a state in which the friction facing 37 is in contact with the front cover 2, and the inner peripheral portion of the space A is in communication with an oil passage formed in the input shaft via a groove formed in the thrust washer 25.

Drive Plate

The drive plate 31 is an annular member made of a metal plate and is placed on the axial direction transmission side of the friction coupling portion 30a of the piston 30. The inner peripheral portion of the drive plate 31 is fixed to the piston 30 by plural rivets 40. Further, plural catch portions 31a that extend toward the axial direction transmission side are formed on the outer peripheral portion of the drive plate 31. The plural catch portions 31a are formed a predetermined interval apart from each other in the circumferential direction and support the end faces of the outer peripheral side torsion springs 32. Moreover, a support portion 31b that extends toward the axial direction transmission side is formed above the portion of the drive plate 31 attached to the piston. The inner peripheral sides of the outer peripheral side torsion springs 32 are supported by the support portion 31b.

Outer Peripheral Side Torsion Springs

The plural outer peripheral side torsion springs 32 are arranged adjacently in the circumferential direction in a predetermined position in the radial direction. The plural outer peripheral side torsion springs 32 are configured from plural pairs of the outer peripheral side torsion springs 32. Here, there are two outer peripheral side torsion springs 32 in one set, for a sum total of eight outer peripheral side torsion springs 32.

The free lengths of the two outer peripheral side torsion springs 32 of each set are set in such a way that the sum total of the free lengths of the two outer peripheral side torsion springs 32 of each set becomes a predetermined length. Further, the free lengths of the two outer peripheral side torsion springs 32 of each set are set in such a way that one free length of either of the two outer peripheral side torsion springs 32 of each set is shorter than the other free length of either of the two outer peripheral side torsion springs 32 of each set. In FIG. 2, the outer peripheral side torsion spring 32 with the short free length is short is denoted by sign 32a, and the outer peripheral side torsion spring 32 with the long free length is denoted by sign 32b.

Further, because the two outer peripheral side torsion springs 32 of each set are set in such a way that the sum total of the free lengths of the two outer peripheral side torsion springs 32 of each set becomes a predetermined length, if one free length of either of the two outer peripheral side torsion springs 32 of each set is short, the other free length of either of the two outer peripheral side torsion springs 32 of each set becomes longer in correspondence thereto.

Further, the free lengths of the outer peripheral side torsion springs 32 are set in such a way that the ratio of the other free length of either of the two outer peripheral side torsion springs 32 of each set with respect to one free length of either of the two outer peripheral side torsion springs 32 of each set falls in the range of 1.1 to 2.5. In this way, by setting the sum total of the free lengths of the two outer peripheral side torsion springs 32 of each set to a predetermined length and setting the free lengths of the outer peripheral side torsion springs 32 in the range of the ratio described above, the outer peripheral side torsion spring 32b with the long free length can be restricted in such a way that there is no close inter-wire contact at an early stage.

Here, the sum total of the free lengths of the two outer peripheral side torsion springs 32 of each set is set to 140 mm. Further, the free length of the outer peripheral side torsion spring 32a with the short free length is set to 60 mm, and the free length of the outer peripheral side torsion spring 32b with the long free length is set to 80 mm.

In the two outer peripheral side torsion springs 32 of each set described above, the outer peripheral side torsion spring 32a with the short free length is placed on the input side. Here, in a case where torsional vibration has occurred in the lock-up device 7 and the piston 30 and the drive plate 31 have rotated in the direction of R1 in FIG. 2, the spring that is pressed in the direction of R1 by the piston 30 and the drive plate 31 is the outer peripheral side torsion spring 32a with the short free length. The direction of R1 corresponds to the main rotational direction of the engine.

Further, a float member 42 is disposed in the neighborhood of the outer peripheral side torsion springs 32 so that the two outer peripheral side torsion springs 32 of each set act in series. The float member 42 is an annular member with a C-shaped cross section and is placed above the support portion 31b of the drive plate 31. The float member 42 is placed in such a way as to be rotatable relative to the drive plate 31. The outer peripheral portion of the float member 42 supports the outer peripheral portions of the outer peripheral side torsion springs 32. That is, the outer peripheral side torsion springs 32 are restricted from popping out toward the outer peripheral side by the float member 42. Axial direction transmission side distal end portions 42a of the float member 42 are bent toward the inner peripheral side and the engine side, and bent portions 42a of the distal end portions are inserted between the outer peripheral side torsion springs 32 of each set. That is, both circumferential direction end faces of the bent portions 42a are in contact with the end faces of the corresponding torsion springs 32.

As described above, in the plural outer peripheral side torsion springs 32, both circumferential direction ends of the outer peripheral side torsion springs 32 of each set are supported by the catch portions 31a of the drive plate 31, and the bent portions 42a of the float member 42 are inserted between the outer peripheral side torsion springs 32 of each set. Further, the outer peripheral portions of the outer peripheral side torsion springs 32 are supported by the outer peripheral portion of the float member 42.

Middle Member

The middle member 34 is an annular, disc-shaped plate member placed between the piston 30 and the turbine shell 15. The middle member 34 is configured from a first plate 44 and a second plate 45. The first plate 44 and the second plate 45 are placed an interval apart from each other in the axial direction. The first plate 44 is placed on the axial direction transmission side, and the second plate 45 is placed on the axial direction engine side. The outer peripheral portions of the first plate 44 and the second plate 45 are coupled together by plural stopper pins 46 in such a way that the first plate 44 and the second plate 45 are non-rotatable relative to each other and are immovable in the axial direction. Window portions 44a and 45a that penetrate the first plate 44 and the second plate 45 in the axial direction are formed in the first plate 44 and the second plate 45, respectively. As is apparent from FIG. 1 and FIG. 2, the window portions 44a and 45a are formed extending in the circumferential direction, and cut-and-raised portions that have been cut and raised in the axial direction are formed on the inner peripheral portions and the outer peripheral portions of the window portions 44a and 45a.

Further, plural catch portions 44b that extend as far as the outer peripheral side torsion springs 32 are formed on the outer peripheral end of the first plate 44. The plural catch portions 44b are formed by bending the distal ends of the first plate 44 toward the axial direction engine side. The plural catch portions 44b are arranged a predetermined interval apart from each other in the circumferential direction, and the outer peripheral side torsion springs 32 of each set that act in series are placed between two of the catch portions 44b.

Inner Peripheral Side Torsion Springs

The plural inner peripheral side torsion springs 33 are placed inside the window portions 44a and 45a of both plates 44 and 45 of the middle member 34. Additionally, both circumferential direction ends and both radial direction sides of each of the inner peripheral side torsion springs 33 are supported by the window portions 44a and 45a. Moreover, the inner peripheral side torsion springs 33 are restricted from popping out in the axial direction by the cut-and-raised portions of the window portions 44 and 45.

Driven Plate

The driven plate 35 is an annular, disc-shaped member, and its inner peripheral portion is fixed to the flange 17a of the turbine hub 17 by the rivets 18 together with the turbine shell 15. The driven plate 35 is placed between the first plate 44 and the second plate 45 in such a way as to be rotatable relative to both plates 44 and 45. Additionally, window holes 35a are formed in the outer peripheral portion of the driven plate 35 in correspondence to the window portions 44a and 45a of the first and second plates 44 and 45. The window holes 35a are holes that penetrate the driven plate 35 in the axial direction, and the inner peripheral side torsion springs 33 are placed in the window holes 35a. Further, as indicated by a dashed line in FIG. 2, plural cutouts 35b that are long in the circumferential direction are formed in the outer peripheral portion of the driven plate 35. Additionally, the stopper pins 46 penetrate the cutouts 35b in the axial direction. Consequently, the driven plate 35 and both plates 44 and 45 configuring the middle member 34 are rotatable relative to each other in the angular ranges in which the cutouts 35b are formed.

Operation

Next, the operation will be described. The torque from the crankshaft on the engine side is input to the front cover 2. Because of this, the impeller 3 rotates and hydraulic oil flows from the impeller 3 to the turbine 4. Because of the flow of the hydraulic oil, the turbine 4 rotates and the torque of the turbine 4 is output to the unillustrated input shaft.

The speed ratio of the torque converter 1 increases, and when the input shaft reaches a prescribed rotational speed, the hydraulic oil in the space A is drained through the oil passage inside the input shaft. As a result, the piston 30 is moved toward the front cover 2 side. As a result, the friction facing 37 of the piston 30 is pressed against the friction surface of the front cover 2 and the torque of the front cover 2 is output to the lock-up device 7.

In the lock-up device 7, the torque is transmitted in the order of the piston 30, the drive plate 31, the outer peripheral side torsion springs 32 (32a and 32b), the middle member 34, the inner peripheral side torsion springs 33, and the driven plate 35 and is output to the turbine hub 17.

The lock-up device 7 transmits the torque and absorbs and damps torque fluctuations input from the front cover 2. Specifically, when torsional vibration occurs in the lock-up device 7, the outer peripheral side torsion springs 32 and the inner peripheral side torsion springs 33 are compressed in series between the drive plate 31 and the driven plate 35. Moreover, regarding the outer peripheral side torsion springs 32 also, the outer peripheral side torsion springs 32 of each set are compressed in series. For this reason, the torsion angle can be widened. Moreover, because the outer peripheral side torsion springs 32 that can take a long circumferential direction distance are caused to act in series, a wider torsion angle can be ensured. This means that the torsion characteristic can be lowered in rigidity, so that the vibration absorption and damping performance can be further improved.

The outer peripheral side torsion springs 32 and the inner peripheral side torsion springs 33 act until the stopper pins 46 come into contact with the end faces of the cutouts 35b formed in the driven plate 35, and only the outer peripheral side torsion springs 32 act (the inner peripheral side torsion springs 33 do not act) after the stopper pins 46 have come into contact with the end faces of the cutouts 35b. Consequently, the lock-up device 7 has a two-stage torsion characteristic.

Here, the outer peripheral side torsion springs 32 try to move toward the outer peripheral side because of centrifugal force. For this reason, a member that restricts the movement of the outer peripheral side torsion springs 32 toward the outer peripheral side becomes necessary. In this embodiment, the outer peripheral portions of the outer peripheral side torsion springs 32 are supported by the float member 42, whereby the movement of the outer peripheral side torsion springs 32 toward the outer peripheral side is restricted. At this time, the float member 42 moves together with the outer peripheral side torsion springs 32, so sliding resistance can be reduced compared to a case where the outer peripheral portions of the outer peripheral side torsion springs are supported by the drive plate like in a well-known device.

Further, in this embodiment, the outer peripheral side torsion springs 32 and the inner peripheral side torsion springs 33 are coupled together by the middle member 34, so the overall hysteresis torque becomes the coupling of the inner peripheral side and outer peripheral side hysteresis torques. That is, in the present embodiment, the hysteresis torque of the outer peripheral side torsion springs 32 is smaller and the hysteresis torque of the inner peripheral side torsion springs 33 is not different, so the overall hysteresis torque also becomes smaller. For this reason, the vibration absorption and damping performance can be improved and lower fuel consumption can be realized because of the expansion of the lock-up range.

Characteristics and Effects of Lock-Up Device

Figure 3:
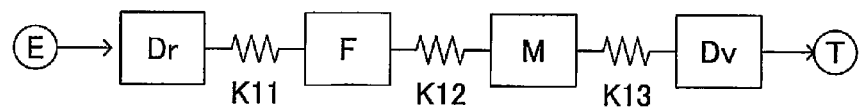
FIG. 3 is a vibration model of a well-known lock-up device.
Figure 4:
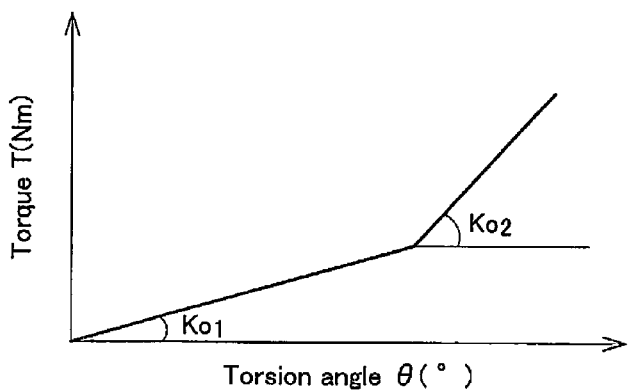
FIG. 4 is a conceptual diagram showing the torsion characteristic of the well-known lock-up device.

Here, first, before giving a description of the present lock-up device 7, a description of a case where the free lengths and the rigidities of the two outer peripheral side torsion springs 32 of each set are set to be identical will be given. This corresponds to a well-known lock-up device, and other configurations excluding the outer peripheral side torsion springs 32 are the same as those of the present lock-up device. The torsion characteristic in this case is also a two-stage torsion characteristic such as described above. A model diagram showing the two-stage torsion characteristic is shown in FIG. 3. Sign E shown in FIG. 3 represents the engine, and sign T represents the transmission. Further, sign Dr, sign F, sign M, and sign Dv represent the drive plate, the float member, the middle member, and the driven plate, respectively. Moreover, a conceptual diagram of the torsion characteristic in this case and a conceptual diagram of the vibration level (fluctuation level) of the lock-up device are shown in FIG. 4 and FIG. 5.

In this case, the outer peripheral side torsion springs 32 and the inner peripheral side torsion springs 33 operate until the stopper pins 46 come into contact with the end faces of the cutouts 35b formed in the driven plate 35. For this reason, the overall rigidity Ko1 becomes "Ko1=1/(2/K11+1/K13)" (see FIG. 4). Here, K11 is the rigidity of each of the two outer peripheral side torsion springs 32 of each set, and K13 is the rigidity of the inner peripheral side torsion springs 33. Additionally, only the outer peripheral side torsion springs 32 operate after the stopper pins 46 have come into contact with the end faces of the cutouts 35b formed in the driven plate 35. For this reason, the overall rigidity Ko2 becomes "Ko2=K11/2".

Figure 5:
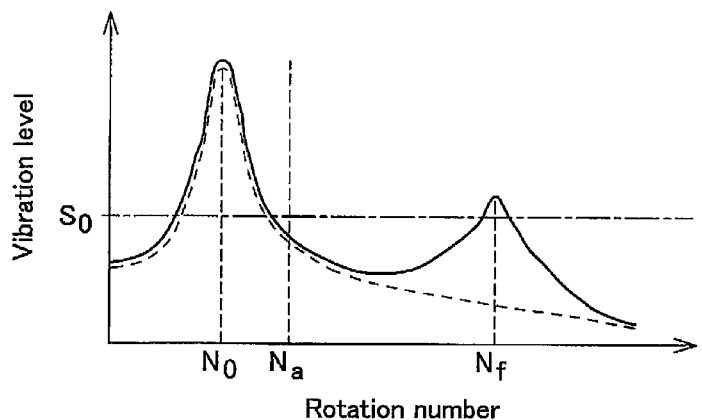
FIG. 5 is a conceptual diagram showing the vibration level of the well-known lock-up device.

Referring to FIG. 5, in the well-known lock-up device, the normal mode (primary mode) of the lock-up device is set below the lock-up speed Na. Additionally, as the speed increases, the vibration level (amount of fluctuation) falls. However, when the speed approaches a predetermined speed, the vibration level again rises. This speed is the resonance speed Nf of the float member. In the well-known lock-up device, there is the concern that the vibration level at this resonance speed Nf will become higher than the allowable level.

The vibration level in FIG. 5 corresponds to fluctuations in the rotation of the transmission, and the speed in FIG. 5 corresponds to the engine speed. Further, No in FIG. 5 corresponds to the natural frequency at which the normal mode of the lock-up device becomes prominent, and Nf corresponds to the resonance speed at which the mode of the float member becomes prominent. Further, So represents the upper limit of the allowable value of the vibration level. Moreover, the unit of the vertical axis and the horizontal axis in FIG. 5 is rpm. The description that has been given here is also applied to FIG. 8 described later.

Figure 6:
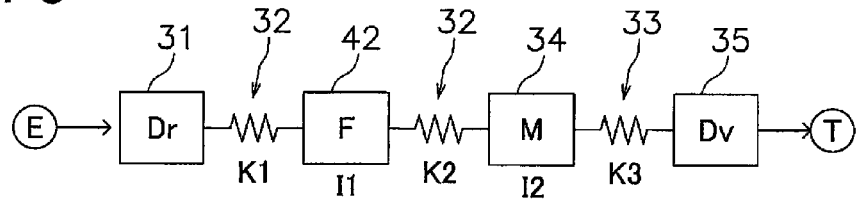
FIG. 6 is a vibration model of the lock-up device.
Figure 7:
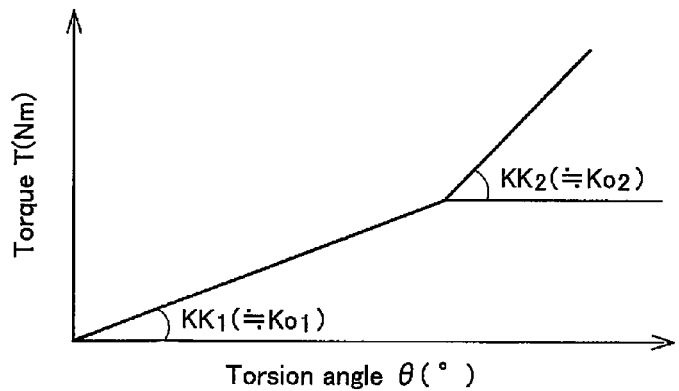
FIG. 7 is a conceptual diagram showing the torsion characteristic of the lock-up device.

In the case of the present lock-up device 7, the free lengths—that is, the rigidities—of the two outer peripheral side torsion springs 32 of each set are different. A model diagram showing the two-stage torsion characteristic in this case is shown in FIG. 6. The signs shown in FIG. 6 have the same meanings as those of the signs described in FIG. 3. Further, in FIG. 6, I1 and I2 are shown, and these are the secondary moments of inertia of each member. Moreover, a conceptual diagram of the torsion characteristic in this case and a conceptual diagram of the vibration level (fluctuation level) of the lock-up device 7 are shown in FIG. 7 and FIG. 8.

Next, a description of the present lock-up device 7 will be given. In the present lock-up device 7, the outer peripheral side torsion springs 32 and the inner peripheral side torsion springs 33 operate until the stopper pins 46 come into contact with the end faces of the cutouts 35b formed in the driven plate 35. For this reason, the overall rigidity KK1 becomes "KK1=1/(1/K1+1/K2+1/K3)" (see FIG. 7). Here, K1 and K2 are the rigidities of the outer peripheral side torsion springs 32, and K3 is the rigidity of the inner peripheral side torsion springs 33. Additionally, only the outer peripheral side torsion springs 32 operate after the stopper pins 46 have come into contact with the end faces of the cutouts 35b formed in the driven plate 35. For this reason, the overall rigidity KK2 becomes "KK2=(1/K1+1/K2)".

Here, in the present lock-up device 7, one free length of either of the two outer peripheral side torsion springs 32 of each set is made shorter than the other free length of either of the two outer peripheral side torsion springs 32 of each set, whereby one rigidity K1 of either of the two outer peripheral side torsion springs 32 of each set is set in such a way as to be larger than the other rigidity K2 of either of the two outer peripheral side torsion springs 32. That is, the relationship of "K1>K2" is established. More specifically, in the present lock-up device 7, the relationship of "K1>K11>K2" is established. Because of this, in the present lock-up device 7, the overall rigidity KK1 becomes "K11≈Ko1" and the overall rigidity KK2 becomes "KK2≈Ko2".

Figure 8:
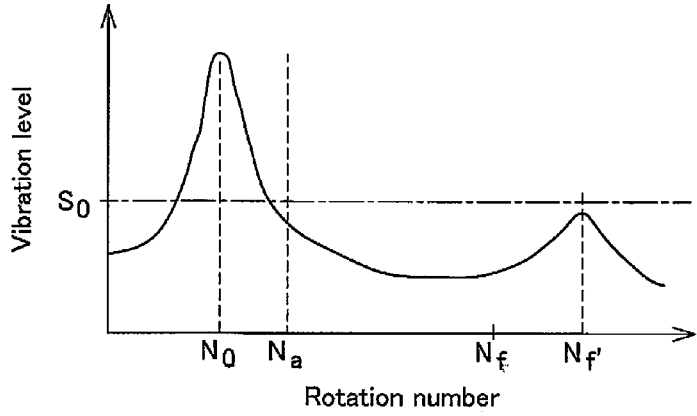
FIG. 8 is a conceptual diagram showing the vibration level of the lock-up device.

In this way, the overall rigidity KK1 of the present lock-up device 7 is substantially the same as the overall rigidity Ko1 in the case where the two outer peripheral side torsion springs 32 of each set are the same, so in the present lock-up device 7 also, as shown in FIG. 8, the normal mode (primary mode) of the lock-up device 7 can be maintained below the lock-up speed Na. Additionally, as the speed increases and approaches the resonance speed Nf' of the float member 42, the vibration level rises. However, in the present lock-up device 7, as described above, the outer peripheral side torsion spring 32a with the short free length is placed on the input side, whereby the resonance speed Nf' of the float member 42 becomes higher than the resonance speed Nf shown in FIG. 5 (Nf'>N0. Because of this, the vibration level at this resonance speed Nf' becomes lower than the vibration level shown in FIG. 5, and as shown in FIG. 8, the vibration level at this resonance speed Nf' can be kept below the allowable level.

The resonance speed (the resonance speed Nf' shown in FIG. 8) at which the vibration of the float member 42 becomes prominent in the present lock-up device 7 is evaluated by "Nf'=1/2π×{1/2×[(K1+K2)/I1+(K2+K3)/I2]−[1/4×[(K1+K2)/I1−(K2+K3)/I2]$^2$+K2$^2$/(I1·I2)]$^{1/2}$}$^{1/2}$".

Looking at this evaluation formula, it will be understood that the rigidity K1 of the outer peripheral side torsion spring 32 on the input side (that is, the engine side) (the rigidity of the outer peripheral side torsion spring 32a with the short free length) has a greater effect on the resonance speed Nf' than the rigidity K2 of the outer peripheral side torsion spring 32b with the long free length. In consideration of this, in the present lock-up device 7, the outer peripheral side torsion spring 32a with the short free length is placed on the input side.

Settings and Effects of Torsion Springs

In a general lock-up device, the sum total of the free lengths of the two outer peripheral side torsion springs 32 of each set is set to a predetermined length. For example, a length obtained by subtracting the circumferential direction length of the bent portion 42a of the float member 42 from the circumferential direction length between two catch portions 31a of the drive plate 31 adjacent to each other in the circumferential direction corresponds to the predetermined length. Setting the sum total of the lengths of the two outer peripheral side torsion springs 32 of each set to the predetermined length in this way means that there is a limit with respect to adjusting each of the outer peripheral side torsion springs 32.

Further, generally, if the wire diameter of the outer peripheral side torsion springs used in the lock-up device is made too narrow, the outer peripheral side torsion springs end up becoming fatigued because of repeated stress, and there is the concern that their performance will end up significantly falling. For this reason, it is necessary to set the wire diameter of the outer peripheral side torsion springs equal to or greater than a predetermined minimum value.

Here, in the well-known lock-up device, if the resonance speed Nf (see FIG. 5) of the float member 42 is set to a higher speed in order to lower the vibration level of the float member 42, it is necessary to raise the rigidity of either one of the two outer peripheral side torsion springs of each set. This can be realized by increasing the wire diameter of either one of the two outer peripheral side torsion springs of each set.

However, because it is necessary to ensure a certain extent of thickness for the wire diameter of the outer peripheral side torsion springs as described above, here, if the wire diameter of either one of the two outer peripheral side torsion springs of each set is increased, the entire rigidities Ko1 and Ko2 end up becoming higher. When this happens, the normal mode of the lock-up device shifts to the high speed side and the vibration level at the lock-up speed Na rises. When this happens, there is the concern that vibration and vibration noise resulting from the normal mode of the lock-up device will end up occurring in the normal range.

Further, because it is necessary to place the two outer peripheral side torsion springs of each set in the limited spaces between two catch portions 31a of the drive plate 31 adjacent to each other in the circumferential direction, in a case where the wire diameter of either one of the two outer peripheral side torsion springs of each set has been increased, close inter-wire contact ends up occurring at an early stage and there is the concern that the performance of the lock-up device will end up becoming unable to be sufficiently exhibited.

In the present lock-up device 7, one wire diameter (a first wire diameter) of either one of the two outer peripheral side torsion springs 32 of each set is set to a predetermined value. Further, the other wire diameter (a second wire diameter) of either one of the two outer peripheral side torsion springs 32 of each set is set to a predetermined value. The predetermined values indicated here are values equal to or greater than the above-described predetermined minimum value. Further, it is not invariably necessary for the first wire diameter and the second wire diameter to be the same size.

In the two outer peripheral side torsion springs 32 of each set, the free length of one of the outer peripheral side torsion springs 32 is set shorter than the free length of the other of the outer peripheral side torsion springs 32 without changing the wire diameters (the first wire diameter and the second wire diameter) of the outer peripheral side torsion springs 32. Here, the free length of the one outer peripheral side torsion spring 32 is set short in the range of the above-described limit, and in accordance with this the free length of the other outer peripheral side torsion spring 32 is set long. By setting the two outer peripheral side torsion springs 32 of each set in this way, as described in "[Characteristics and Effects of Lock-up Device]", the rigidity of one of the outer peripheral side torsion springs 32 is set larger than the rigidity of the other of the outer peripheral side torsion springs 32 without greatly changing the overall rigidity KK1.

Because of this, in the present lock-up device 7, as shown in FIG. 8, the vibration level at the resonance speed Nf of the float member 42 can be kept below the allowable level in a state in which the vibration level at the lock-up speed Na is maintained. That is, the performance of the lock-up device 7 can be sufficiently exhibited.

Other Embodiments Different from First Embodiment (a) The present invention is not limited to the above embodiment and is capable of various modifications and revisions without departing from the scope of the present invention. For example, in the above embodiment, the elastic members were configured by coil springs, but other elastic members formed out of resin or the like can also be used. Further, the numbers and lengths of the coil springs configuring the outer peripheral side and inner peripheral side torsion springs are not limited to the above embodiment. Moreover, the float member is for placing at least two torsion springs (elastic members) in series on the same circumference, and the shape of the float member is not limited to the above embodiment.

(b) In the above embodiment, an example of a case where the outer peripheral side torsion spring 32*a* with the short free length is placed on the input side was described. This assumes a case where the number of cylinders in the engine is small, such as a case where an engine with less than eight cylinders, for example, is used. Assuming a case where the number of cylinders in the engine is large, such as a case where an engine with eight cylinders or more, for example, is used, there is the concern that the resonance speed Nf of the float member will appear in the neighborhood of the lock-up speed Na in the normal speed range. For example, there is the concern that the value of |Nf−Na| in FIG. 5 will end up becoming smaller and end up being strongly affected by the resonance of the float member 42 at the lock-up speed Na. In a case such as this, the resonance speed Nf of the float member 42 is set to a lower speed range than the lock-up speed Na by placing the first elastic member 32*b* with the long free length on the input side. Because of this, the effect of the resonance of the float member in the normal speed range (>Na) can be eliminated. That is, the vibration level of the lock-up device 7 can be kept in the allowable range.

Figure 9:
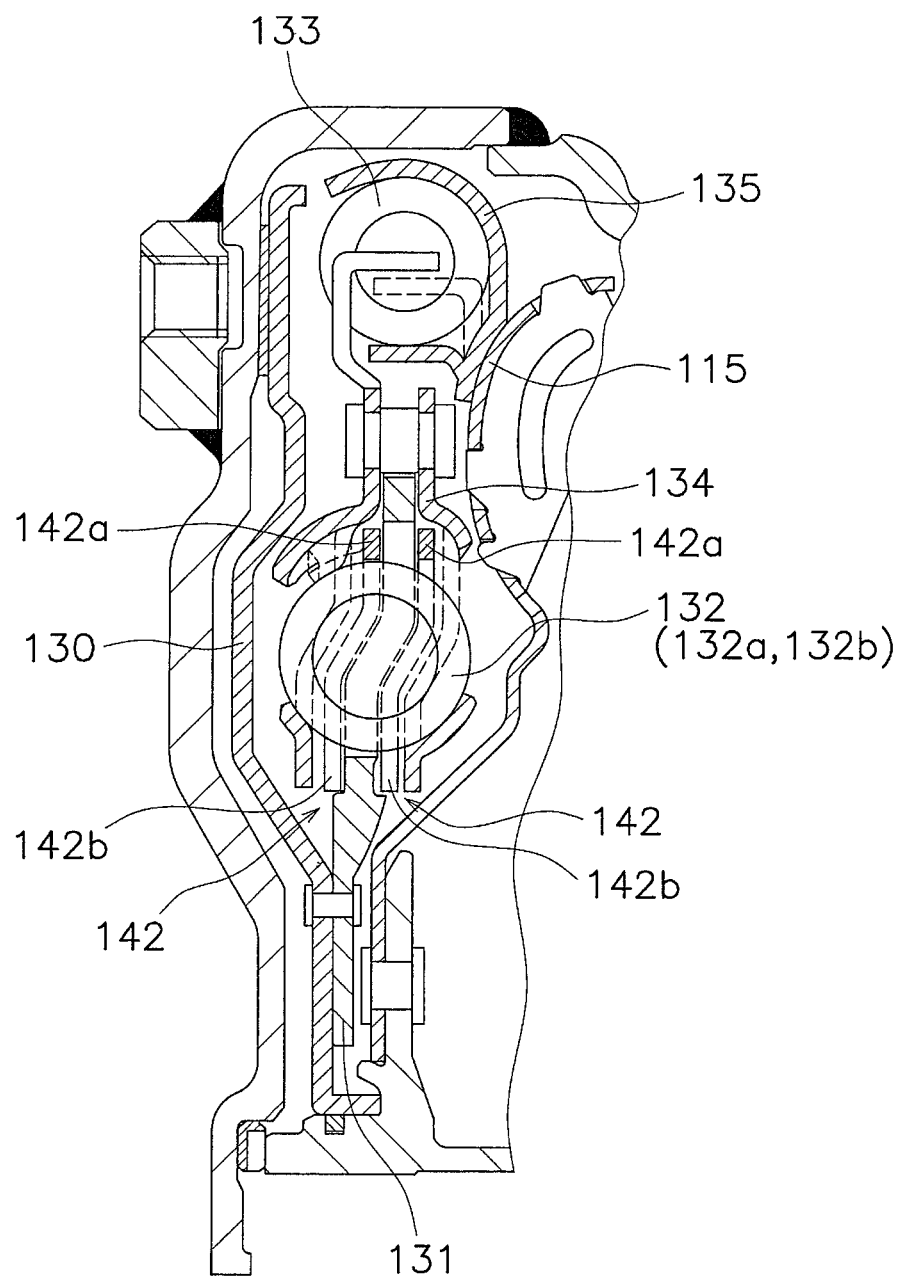
FIG. 9 is a cross-sectional partial view of a torque converter according to another embodiment different from the first embodiment.

(c) In the above embodiment, an example of a case where the torsion springs 32*a* and 32*b* supported by the float member 42 are arranged on the outer peripheral side was described, but the arrangement of the torsion springs 32*a* and 32*b* supported by the float member 42 is not limited to the above embodiment and can be any arrangement. For example, the radial direction arrangement of the outer peripheral side torsion springs 32*a* and 32*b* and the inner peripheral side torsion springs 33 in FIG. 1 and FIG. 2 can also be reversed. An example of this case is shown in FIG. 9. In FIG. 9, torsion springs 133 are arranged on the outer peripheral side and torsion springs 132*a* and 132*b* are arranged on the inner peripheral side. The inner peripheral side torsion springs 132*a* and 132*b* are arranged in series via a float member 142.

Here, the inner peripheral side torsion springs 132*a* and 132*b* are arranged in such a way as to act in series using the float member 142—for example, two float members 142. The two float members 142 are formed in annular shapes. The two float members 142 are arranged in opposition to each other above the inner peripheral side torsion springs 132*a* and 132*b*. Outer peripheral portions 142*a* of the two float members 142 support the outer peripheral portions of the inner peripheral side torsion springs 132*a* and 132*b*. Further, engagement portions 142*b* that engage between the two inner peripheral side torsion springs 132*a* and 132*b* are formed on the inner peripheral sides of the outer peripheral portions 142*a* of the float members 142. The engagement portions 142*b* are sections that project inward from the outer peripheral portions 142*a* and are disposed a predetermined interval apart from each other in the circumferential direction. Both circumferential direction end faces of the engagement portions 142*b* are in contact with the end faces of the corresponding torsion springs 132*a* and 132*b*.

In this case, a driven plate 135 engages with the torsion springs 133 and is attached to a turbine shell 115 on the outer peripheral side of the turbine shell 115. When this happens, the torque is transmitted in the order of a piston 130, a drive plate 131, the torsion springs 132 (132*a* and 132*b*), a middle member 134, the torsion springs 133, and the driven plate 135 and is output to the turbine hub 17. Even when given this configuration, the same effects as those of the above embodiment can be obtained.

Second Embodiment

Figure 10:
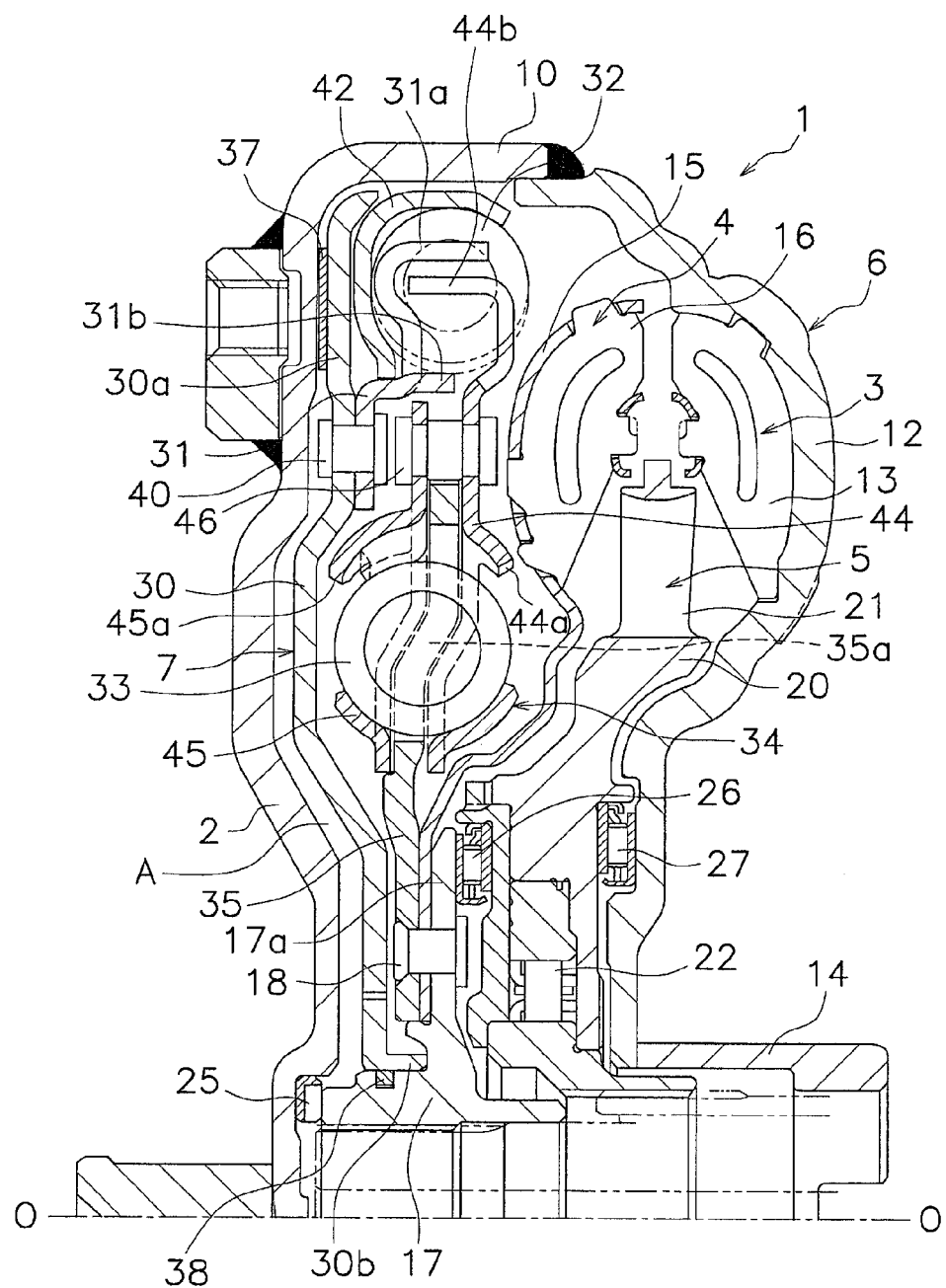
FIG. 10 is a cross-sectional partial view of a torque converter equipped with a lock-up device according to a second embodiment of the present invention.
Figure 11:
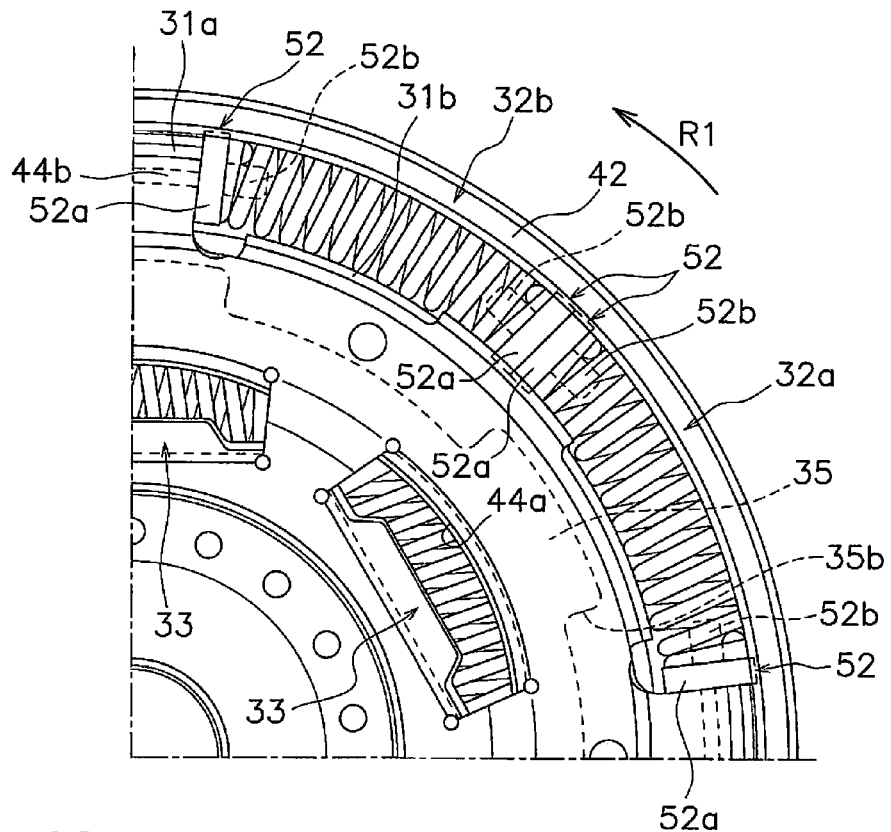
FIG. 11 is a front partial view of the lock-up device.

FIG. 10 is a cross-sectional partial view of a torque converter in which a lock-up device serving as an embodiment of the present invention is employed. An engine (not shown in the drawings) is placed on the left side of FIG. 10, and a transmission (not shown in the drawings) is placed on the right side of the drawing. FIG. 11 is a front partial view of the lock-up device. O-O shown in FIG. 10 is an axis of rotation of the torque converter and the lock-up device.

Overall Configuration of Torque Converter

The torque converter 1 is a device for transmitting torque from a crankshaft (not shown in the drawings) on the engine side to an input shaft of the transmission and is configured from a front cover 2 that is fixed to a member on the input side, a torque converter body 6 that includes three types of vaned wheels (an impeller 3, a turbine 4, and a stator 5), and a lock-up device 7.

The front cover 2 is a disc-shaped member, and an outer peripheral cylindrical portion 10 that projects toward the axial direction transmission side is formed on the outer peripheral portion of the front cover 2. The impeller 3 is configured from an impeller shell 12 that is fixed by welding to the outer peripheral cylindrical portion 10 of the front cover 2, plural impeller blades 13 that are fixed to the inner side of the impeller shell 12, and a cylindrical impeller hub 14 that is disposed on the inner peripheral side of the impeller shell 12. The turbine 4 is placed in opposition to the impeller 3 inside a fluid chamber. The turbine 4 is configured from a turbine shell 15, plural turbine blades 16 that are fixed to the turbine shell 15, and a turbine hub 17 that is fixed to the inner peripheral side of the turbine shell 15. The turbine hub 17 has a flange 17*a* that extends toward the outer peripheral side, and the inner peripheral portion of the turbine shell 15 is fixed to the flange 17a by plural rivets 18. Further, the input shaft of the unillustrated transmission is spline-engaged with the inner peripheral portion of the turbine shell 17.

The stator 5 is placed between the inner peripheral portions of the impeller 3 and the turbine 4 and is a mechanism for redirecting hydraulic oil returning from the turbine 4 to the impeller 3. The stator 5 is mainly configured from a disc-shaped stator carrier 20 and plural stator blades 21 that are disposed on the outer peripheral surface of the stator carrier 20. The stator carrier 20 is supported on an unillustrated fixing shaft via a one-way clutch 22. A thrust washer 25 is disposed between the front cover 2 and the turbine hub 17 in the axial direction, and thrust bearings 26 and 27 are disposed between the turbine hub 17 and the stator carrier 20 and between the stator carrier 20 and the impeller shell 12, respectively.

Lock-Up Device

The lock-up device 7 is placed in an annular space between the front cover 2 and the turbine 4. The lock-up device 7 mainly has a piston 30, a drive plate 31, plural outer peripheral side and inner peripheral side torsion springs 32 and 33, a middle member 34 that couples together the outer peripheral side torsion springs 32 and the inner peripheral side torsion springs 33, and a driven plate 35.

Here, the piston 30 and the drive plate 31 correspond to an input rotation member, and the driven plate 35 corresponds to an output rotation member. Further, the outer peripheral side torsion springs 32 correspond to first elastic members, and the inner peripheral side torsion springs 33 correspond to second elastic members.

Piston

The piston 30 is a disc-shaped plate member and is placed in such a way as to divide the space between the front cover 2 and the turbine 4 in two in the axial direction. The outer peripheral portion of the piston 30 is a flat friction coupling portion 30a, and a friction facing 37 is disposed on the axial direction engine side of the friction coupling portion 30a. A flat friction surface is formed on the front cover 2 in opposition to the friction facing 37. Further, an inner peripheral cylindrical portion 30b that extends toward the axial direction transmission side is disposed on the inner peripheral edge of the piston 30. The inner peripheral surface of the inner peripheral cylindrical portion 30b is supported in such a way as to be movable in the axial direction and the rotational direction with respect to the outer peripheral surface of the turbine hub 17. In a state in which the distal end of the inner peripheral cylindrical portion 30b is in contact with part of the turbine hub 17, the movement of the piston 30 toward the axial direction transmission side is restricted. A seal ring 38 is disposed between the inner peripheral cylindrical portion 30b and the outer peripheral surface of the turbine hub 17.

In this way, a space A is formed between the front cover 2 and the piston 30. The outer peripheral portion of the space A is blocked in a state in which the friction facing 37 is in contact with the front cover 2, and the inner peripheral portion of the space A is in communication with an oil passage formed in the input shaft via a groove formed in the thrust washer 25.

Drive Plate

The drive plate 31 is an annular member made of a metal plate and is placed on the axial direction transmission side of the friction coupling portion 30a of the piston 30. The inner peripheral portion of the drive plate 31 is fixed to the piston 30 by plural rivets 40. Further, plural catch portions 31a that extend toward the axial direction transmission side are formed on the outer peripheral portion of the drive plate 31. The plural catch portions 31a are formed a predetermined interval apart from each other in the circumferential direction and support the end faces of the outer peripheral side torsion springs 32. Moreover, a support portion 31b that extends toward the axial direction transmission side is formed above the portion of the drive plate 31 attached to the piston. The inner peripheral sides of the outer peripheral side torsion springs 32 are supported by the support portion 31b.

Outer Peripheral Side Torsion Springs

As shown in FIG. 11, the plural outer peripheral side torsion springs 32 are formed having the same free lengths. Further, the plural outer peripheral side torsion springs 32 are arranged adjacently in the circumferential direction in a predetermined position in the radial direction. Plural sets of the outer peripheral side torsion springs 32 are configured from pluralities of the outer peripheral side torsion springs 32. Here, there are two outer peripheral side torsion springs 32 in one set, for a sum total of eight outer peripheral side torsion springs 32. The two outer peripheral side torsion springs 32 of each set of the outer peripheral side torsion springs 32 are arranged adjacently in such a way that they act in series mutually.

Further, spring members such as spring seats 52, for example, are attached to both end portions of each of the plural outer peripheral side torsion springs 32. Specifically, each spring seat 52 has a seat portion 52a and a projecting portion 52b. The end portions of the outer peripheral side torsion springs 32 contact the seat portions 52a. The projecting portions 52b are sections that extend cylindrically from the seat portions 52a, and the projecting portions 52b are press-fitted inside the end turns of the outer peripheral side torsion springs 32.

The two outer peripheral side torsion springs 32 of each set are arranged adjacently in series mutually via the spring seats 52. Further, in a state in which the two outer peripheral side torsion springs 32 of each set have been arranged adjacently in series, the spring seats 52 on both end portions of the two outer peripheral side torsion springs 32 arranged in series are in contact with the drive plate 31.

In FIG. 11, the two outer peripheral side torsion springs 32 of one set are denoted by signs 32a and 32b. Further, the direction of R1 shown in FIG. 11 corresponds to the main rotational direction of the engine.

A float member 42 is disposed in the neighborhood of the outer peripheral side torsion springs 32, such as on the outer peripheral sides of the outer peripheral side torsion springs 32 for example, in order to restrict the movement of the outer peripheral side torsion springs 32 in the radial direction. The float member 42 is an annular member with a C-shaped cross section and is placed above the support portion 31b of the drive plate 31. Specifically, the float member 42 is placed in such a way as to be rotatable relative to the drive plate 31. The outer peripheral portion of the float member 42 supports the outer peripheral portions of the outer peripheral side torsion springs 32. That is, the outer peripheral side torsion springs 32 are restricted from popping out toward the outer peripheral side by the float member 42.

Further, the float member 42 and the outer peripheral side torsion springs 32 are rotatable relative to each other in the circumferential direction. Specifically, the float member 42 and both end portions of each of the outer peripheral side torsion springs 32 are rotatable relative to each other. More specifically, the float member 42 and the spring seats 52 attached to both end portions of each of the outer peripheral side torsion springs 32 are rotatable relative to each other. For this reason, in the present lock-up device 7, the two outer peripheral side torsion springs 32 of each set act in series in the circumferential direction without involving the float member 42. Because of this, the torque is transmitted to the drive plate 31, the outer peripheral side torsion springs 32 (32a and 32b), and the middle member 34 without involving the float member 42.

As described above, both circumferential direction end portions of the two outer peripheral side torsion springs 32 of each set—that is, both end portions of the two outer peripheral side torsion springs 32a and 32b in a state in which they are adjacent in series in the circumferential direction—are supported by the catch portions 31a of the drive plate 31 via the spring seats 52. Further, the spring seats 52 are in contact with each other at the circumferential direction central portion of the two outer peripheral side torsion springs 32 of each set—that is, in the central portion of the two outer peripheral side torsion springs 32a and 32b in a state in which they are adjacent in series in the circumferential direction. Because of this, the two outer peripheral side torsion springs 32 of each set act in series mutually without involving the float member and transmit the torque from the drive plate 31 to the middle member 34.

Middle Member

The middle member 34 is an annular, disc-shaped plate member placed between the piston 30 and the turbine shell 15. The middle member 34 is configured from a first plate 44 and a second plate 45. The first plate 44 and the second plate 45 are placed an interval apart from each other in the axial direction. The first plate 44 is placed on the axial direction transmission side, and the second plate 45 is placed on the axial direction engine side. The outer peripheral portions of the first plate 44 and the second plate 45 are coupled together by plural stopper pins 46 in such a way that the first plate 44 and the second plate 45 are non-rotatable relative to each other and are immovable in the axial direction. Window portions 44a and 45a that penetrate the first plate 44 and the second plate 45 in the axial direction are formed in the first plate 44 and the second plate 45, respectively. As is apparent from FIG. 10 and FIG. 11, the window portions 44a and 45a are formed extending in the circumferential direction, and cut-and-raised portions that have been cut and raised in the axial direction are formed on the inner peripheral portions and the outer peripheral portions of the window portions 44a and 45a.

Further, plural catch portions 44b that extend as far as the outer peripheral side torsion springs 32 are formed on the outer peripheral end of the first plate 44. The plural catch portions 44b are formed by bending the distal ends of the first plate 44 toward the axial direction engine side. The plural catch portions 44b are arranged a predetermined interval apart from each other in the circumferential direction, and the outer peripheral side torsion springs 32 of each set that act in series are placed between two of the catch portions 44b.

Inner Peripheral Side Torsion Springs

The plural inner peripheral side torsion springs 33 are placed inside the window portions 44a and 45a of both plates 44 and 45 of the middle member 34. Additionally, both circumferential direction ends and both radial direction sides of each of the inner peripheral side torsion springs 33 are supported by the window portions 44a and 45a. Moreover, the inner peripheral side torsion springs 33 are restricted from popping out in the axial direction by the cut-and-raised portions of the window portions 44 and 45.

Driven Plate

The driven plate 35 is an annular, disc-shaped member, and its inner peripheral portion is fixed to the flange 17a of the turbine hub 17 by the rivets 18 together with the turbine shell 15. The driven plate 35 is placed between the first plate 44 and the second plate 45 in such a way as to be rotatable relative to both plates 44 and 45. Additionally, window holes 35a are formed in the outer peripheral portion of the driven plate 35 in correspondence to the window portions 44a and 45a of the first and second plates 44 and 45. The window holes 35a are holes that penetrate the driven plate 35 in the axial direction, and the inner peripheral side torsion springs 33 are placed in the window holes 35a. Further, as indicated by a dashed line in FIG. 11, plural cutouts 35b that are long in the circumferential direction are formed in the outer peripheral portion of the driven plate 35. Additionally, the stopper pins 46 penetrate the cutouts 35b in the axial direction. Consequently, the driven plate 35 and both plates 44 and 45 configuring the middle member 34 are rotatable relative to each other in the angular ranges in which the cutouts 35b are formed.

Operation

Next, the operation will be described. The torque from the crankshaft on the engine side is input to the front cover 2. Because of this, the impeller 3 rotates and hydraulic oil flows from the impeller 3 to the turbine 4. Because of the flow of the hydraulic oil, the turbine 4 rotates and the torque of the turbine 4 is output to the unillustrated input shaft.

The speed ratio of the torque converter 1 increases, and when the input shaft reaches a prescribed rotational speed, the hydraulic oil in the space A is drained through the oil passage inside the input shaft. As a result, the piston 30 is moved toward the front cover 2 side. As a result, the friction facing 37 of the piston 30 is pressed against the friction surface of the front cover 2 and the torque of the front cover 2 is output to the lock-up device 7.

In the lock-up device 7, the torque is transmitted in the order of the piston 30, the drive plate 31, the outer peripheral side torsion springs 32 (32a and 32b), the middle member 34, the inner peripheral side torsion springs 33, and the driven plate 35 and is output to the turbine hub 17. In particular, in the lock-up device 7, the float member 42 is not present in the torque transmission path.

The lock-up device 7 transmits the torque and absorbs and damps torque fluctuations input from the front cover 2. Specifically, when torsional vibration occurs in the lock-up device 7, the outer peripheral side torsion springs 32 and the inner peripheral side torsion springs 33 are compressed in series between the drive plate 31 and the driven plate 35. Moreover, regarding the outer peripheral side torsion springs 32 also, the outer peripheral side torsion springs 32 of each set are compressed in series. For this reason, the torsion angle can be widened. Moreover, because the outer peripheral side torsion springs 32 that can take a long circumferential direction distance are caused to act in series, a wider torsion angle can be ensured. This means that the torsion characteristic can be lowered in rigidity, so that the vibration absorption and damping performance can be further improved.

The outer peripheral side torsion springs 32 and the inner peripheral side torsion springs 33 act until the stopper pins 46 come into contact with the end faces of the cutouts 35b formed in the driven plate 35, and only the outer peripheral side torsion springs 32 act (the inner peripheral side torsion springs 33 do not act) after the stopper pins 46 have come into contact with the end faces of the cutouts 35b. Consequently, the lock-up device 7 has a two-stage torsion characteristic.

Here, the outer peripheral side torsion springs 32 try to move toward the outer peripheral side because of centrifugal force. For this reason, a member that restricts the movement of the outer peripheral side torsion springs 32 toward the outer peripheral side becomes necessary. In this embodiment, the outer peripheral portions of the outer peripheral side torsion springs 32 are supported by the float member 42, whereby the movement of the outer peripheral side torsion springs 32 toward the outer peripheral side is restricted.

In the case of using the float member 42, frictional resistance F occurs between the float member 42 and the outer peripheral side torsion springs 32. Here, in a case where the inertia torque Tk of the float member 42 is equal to or less than the frictional resistance F (Tk≤F; Tk (Nm)=I (kgm$^2$)×ω (rad/m$^2$), the float member 42 rotates together with the lock-up device 7 excluding the float member 42. Here, I is the moment of inertia and w is each acceleration. In a case where the inertia torque Tk of the float member 42 has become greater than the frictional resistance F (Tk>F), the float member 42 and the outer peripheral side torsion springs 32 slide and the lock-up device 7 excluding the float member 42 becomes rotatable relative to the float member 42.

Here, because the inertia torque Tk of the float member 42 is proportional to the moment of inertia I as described above, it is preferred that the float member 42 be formed in such a way that the moment of inertia increases. For example, the moment of inertia I of the float member 42 can be increased by making the plate thickness of the float member 42 thicker. By increasing the moment of inertia I of the float member 42 in this way, the lock-up device 7 excluding the float member 42 and the float member 42 can be made rotatable relative to each other at a low speed.

Figure 16:
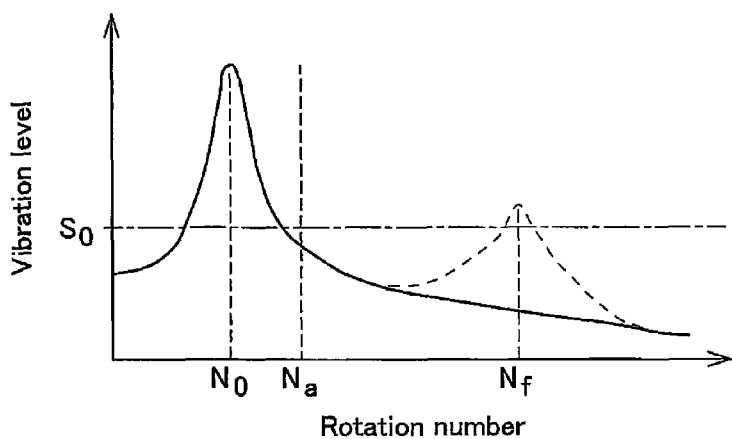
FIG. 16 is a conceptual diagram showing the vibration level of the lock-up device.

In this way, because the lock-up device 7 excluding the float member 42 becomes rotatable relative to the float member 42 in a case where the inertia torque Tk of the float member 42 has become greater than the frictional resistance F, the vibration component of the float member 42 can be removed from the vibration system of the lock-up device 7. That is, in the present lock-up device 7, the resonance resulting from the float member that had occurred in the well-known lock-up device can be removed. Because of this, in the present lock-up device 7, as shown in FIG. 16, the vibration level can be kept in the allowable range.

Characteristics and Effects of Lock-Up Device

Figure 12:
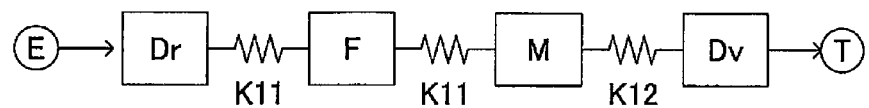
FIG. 12 is a vibration model of a well-known lock-up device.
Figure 13:
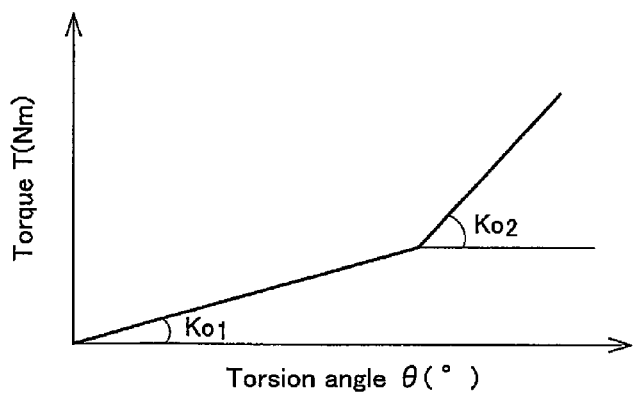
FIG. 13 is a conceptual diagram showing the torsion characteristic of the well-known lock-up device.

Here, first, before giving a description of the present lock-up device 7, a description of a case where the two outer peripheral side torsion springs 32 of each set act in series via the float member 42 will be given. This corresponds to a well-known lock-up device. Excluding the point that the two outer peripheral side torsion springs 32 of each set act in series via the float member 42, other configurations of the well-known lock-up device are the same as those of the present lock-up device 7. The torsion characteristic in this case is also a two-stage torsion characteristic such as described above. A model diagram showing the two-stage torsion characteristic is shown in FIG. 12. Sign E shown in FIG. 12 represents the engine, and sign T represents the transmission. Further, sign Dr, sign F, sign M, and sign Dv represent the drive plate, the float member, the middle member, and the driven plate, respectively. Moreover, a conceptual diagram of the torsion characteristic in this case and a conceptual diagram of the vibration level (fluctuation level) of the lock-up device are shown in FIG. 13 and FIG. 14.

In this case, the outer peripheral side torsion springs 32 and the inner peripheral side torsion springs 33 operate until the stopper pins 46 come into contact with the end faces of the cutouts 35b formed in the driven plate 35. For this reason, the overall rigidity Ko1 becomes "Ko1=1/(2/K11+1/K12)" (see FIG. 13). Here, K11 is the rigidity of each of the two outer peripheral side torsion springs 32 of each set, and K12 is the rigidity of the inner peripheral side torsion springs 33. Additionally, only the outer peripheral side torsion springs 32 operate after the stopper pins 46 have come into contact with the end faces of the cutouts 35b formed in the driven plate 35. For this reason, the overall rigidity Ko2 becomes "Ko2=K11/2".

Figure 14:
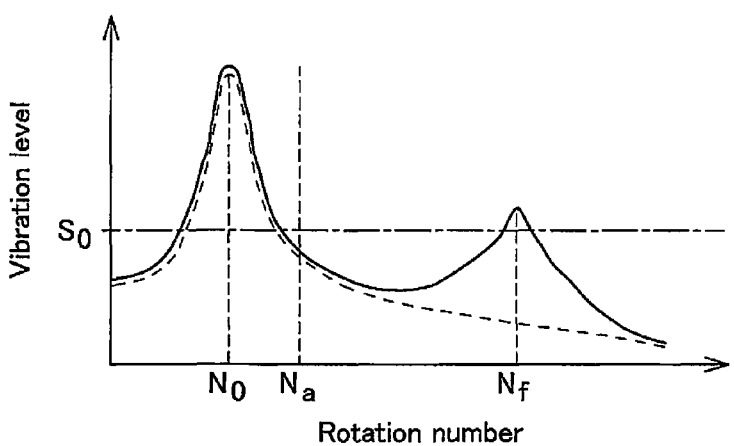
FIG. 14 is a conceptual diagram showing the vibration level of the well-known lock-up device.

Referring to FIG. 14, in the well-known lock-up device, the normal mode (primary mode) of the lock-up device is set below the lock-up speed Na. Additionally, as the speed increases, the vibration level (amount of fluctuation) falls. However, when the speed approaches a predetermined speed, the vibration level again rises. This speed is the resonance speed Nf of the float member. In the well-known lock-up device, there is the concern that the vibration level at this resonance speed Nf will become higher than the allowable level.

The vibration level in FIG. 14 corresponds to fluctuations in the rotation of the transmission, and the speed in FIG. 14 corresponds to the engine speed. Further, No in FIG. 14 corresponds to the natural frequency at which the normal mode of the lock-up device becomes prominent, and Nf corresponds to the resonance speed at which the mode of the float member becomes prominent. Further, So represents the upper limit of the allowable value of the vibration level. Moreover, the unit of the vertical axis and the horizontal axis in FIG. 14 is rpm. The description that has been given here is also applied with respect to FIG. 16 described later.

Figure 15:
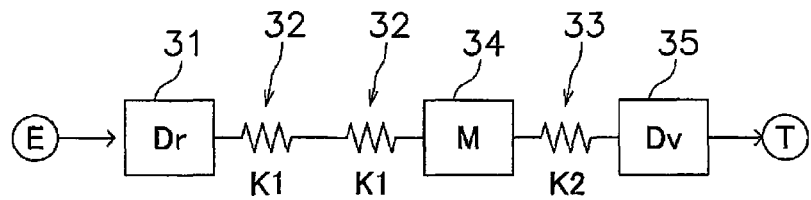
FIG. 15 is a vibration model of the lock-up device.

In the case of the present lock-up device 7, the two outer peripheral side torsion springs 32 of each set and the float member 42 are rotatable relative to each other. A model diagram showing the two-stage torsion characteristic in this case is shown in FIG. 15. The signs shown in FIG. 15 have the same meanings as those of the signs described in FIG. 12. Further, a conceptual diagram of the vibration level (fluctuation level) of the lock-up device 7 in this case is shown in FIG. 16.

Next, a description of the present lock-up device 7 will be given. In the present lock-up device 7, the outer peripheral side torsion springs 32 and the inner peripheral side torsion springs 33 operate until the stopper pins 46 come into contact with the end faces of the cutouts 35b formed in the driven plate 35. Additionally, only the outer peripheral side torsion springs 32 operate after the stopper pins 46 have come into contact with the end faces of the cutouts 35b formed in the driven plate 35.

The overall rigidity of the present lock-up device 7 is the same as the overall rigidity in a case where the two outer peripheral side torsion springs 32 of each set act in series because of the float member 42, so in the present lock-up device 7 also, as shown in FIG. 16, the normal mode (primary mode) of the lock-up device 7 can be maintained below the lock-up speed Na. Further, in the present lock-up device 7, the float member 42 is not involved in the vibration system of the lock-up device 7, so even if the speed increases, the occurrence of resonance of the float member 42 can be suppressed (see the solid line in FIG. 16). Because of this, in the present lock-up device 7, as shown in FIG. 16, the vibration level can be kept below the allowable level.

Other Embodiments Different from Second Embodiment (a) The present invention is not limited to the above embodiment and is capable of various modifications and revisions without departing from the scope of the present invention. For example, in the above embodiment, the elastic members were configured by linear coil springs, but other elastic members can also be used. For example, instead of linear coil springs, arc-shaped coil springs can also be used. In this case, torsion characteristics with various variations can be easily designed. Further, the numbers and lengths of the coil springs configuring the outer peripheral side and inner peripheral side torsion springs are not limited to the above embodiment. Moreover, the float member 42 is for restricting the movement of the torsion springs (elastic members) toward the outer peripheral side, and the shape of the float member 42 is not limited to the above embodiment.

(b) In the above embodiment, an example of a case where the spring seats 52 are attached to both end portions of each of the outer peripheral side torsion springs 32 was described. However, the shape and mode of attachment of the spring seats 52 are not limited to the above embodiment and can be any shape and mode of attachment.

Figure 17:
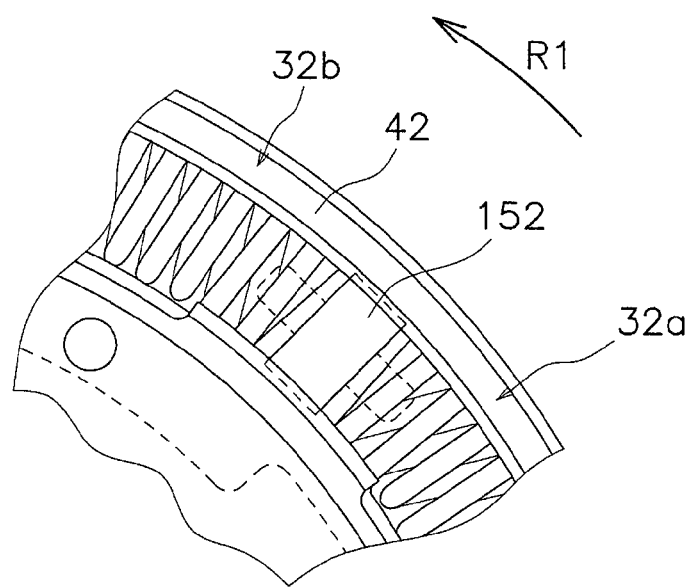
FIG. 17 is a diagram showing a spring seat of a lock-up device according to another embodiment different from the second embodiment (1)

For example, as shown in FIG. 17, in the two outer peripheral side torsion springs 32 of each set, the one outer peripheral side torsion spring 32a and the other outer peripheral side torsion spring 32b can also be coupled to each other by one spring seat 152. In this case, the two outer peripheral side torsion springs 32 can be attached between adjacent catch portions 31a of the drive plate 31 in a state in which the two outer peripheral side torsion springs 32 have been integrated coupled together by the spring seat 152. Because of this, in the case of using the spring seat 152 shown in FIG. 17, the efficiency with which the lock-up device is assembled can be improved compared to the case of using the separate spring seats 52 described in the above embodiment.

Figure 18:
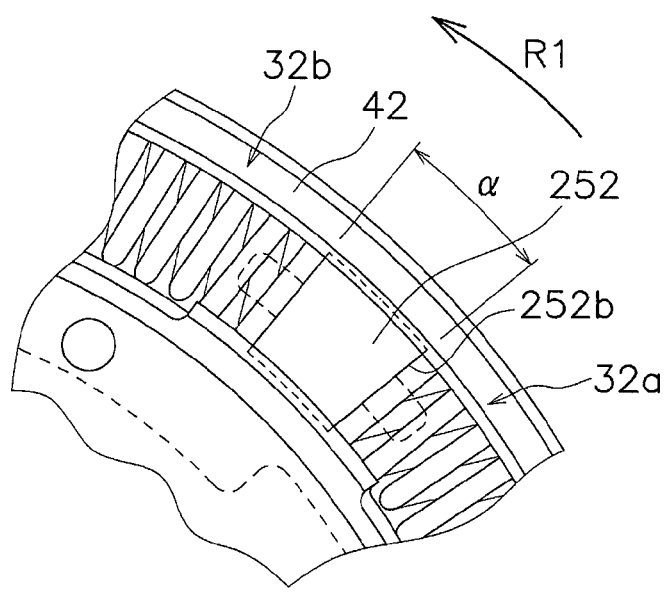
FIG. 18 is a diagram showing a spring seat of a lock-up device according to another embodiment different from the second embodiment (2).

Further, as shown in FIG. 18, faces 252a and 252b of a spring seat 252 that the two outer peripheral side torsion springs 32a and 32b contact can be inclined. In this case, for example, the spring seat 252 is formed in such a way that the angle formed by the two faces 252a and 252b formed on the spring seat 252 becomes a predetermined angle α. By forming the spring seat 252 in this way, the compression direction of the two outer peripheral side torsion springs 32a and 32b of each set can be appropriately guided in the axial direction of the outer peripheral side torsion springs 32. Because of this, it becomes difficult for the two outer peripheral side torsion springs 32a and 32b of each set to contact the float member 42, so the frictional force acting between the outer peripheral side torsion springs 32a and 32b and the float member 42 can be reduced. Because of this, the vibration level of the lock-up device can be reduced.

(c) In the above embodiment, an example of a case where the spring seats 52 are attached to both end portions of each of the outer peripheral side torsion springs 32 was described. However, provided that the two outer peripheral side torsion springs 32 of each set can be caused to act in series, it is not invariably necessary to use the spring seats 52. For example, the end portions of the two outer peripheral side torsion springs 32 of each set can also be brought into direct contact with each other. More specifically, the end turn portions of the two outer peripheral side torsion springs 32 of each set can also be brought into direct contact with each other. In this case, special members such as spring seats become unnecessary, so the number of parts and the steps required to install the spring seats can be reduced.

INDUSTRIAL APPLICABILITY

The present invention is applicable to a lock-up device for a fluid coupling for transmitting torque and absorbing and damping torsional vibration.

The invention claimed is:

1. A lock-up device for a fluid coupling for transmitting torque and absorbing and damping torsional vibration, the lock-up device for the fluid coupling comprising:
   an input rotation member;
   an output rotation member;
   a plurality of first elastic members that are compressed in a rotational direction by relative rotation between the input rotation member and the output rotation member; and
   a float member configured to move in the rotational direction with respect to the input rotation member to cause two of the first elastic members among the plurality of first elastic members to act in series in a circumferential direction,
   the two first elastic members being arranged adjacent to each other in the circumferential direction, the two of the first elastic members being configured at a predetermined distance away from a center of the rotation of the input rotation member, and
   a length of one of the two first elastic members in a free state being shorter than a length of the other of the two first elastic members,
   a rigidity of the one of the two first elastic members being greater than a rigidity of the other of the two first elastic members,
   the float member engaging the two first elastic members and not being directly connected to the output rotation member.

2. The lock-up device for the fluid coupling according to claim 1, further comprising
   a plurality of second elastic members being configured on either one of an inner peripheral side and an outer peripheral side of the plurality of first elastic members, the plurality of second elastic members being configured to transmit the torque to the output rotation member, and
   a middle member being configured in such a way as to be rotatable relative to the input rotation member in order to transmit the torque from the first elastic members to the second elastic members.

3. The lock-up device for a fluid coupling according to claim 1, wherein
   the one of the two first elastic members is placed on a side to which the torque is input by the input rotation member.

4. The lock-up device for the fluid coupling according to claim 1, wherein
   the other of the two first elastic members is placed on a side to which the torque is input by the input rotation member.

5. The lock-up device for a fluid coupling according to claim 1, wherein
   a total length of the two first elastic members is predetermined.

6. The lock-up device for a fluid coupling according to claim 1, wherein
   the float member is configured to rotate relative to the input rotation member and to the output rotation member.

* * * * *